Jan. 1, 1924
J. S. MORGAN
PROCESS FOR DETINNING IRON
Filed June 21, 1921
1,479,731
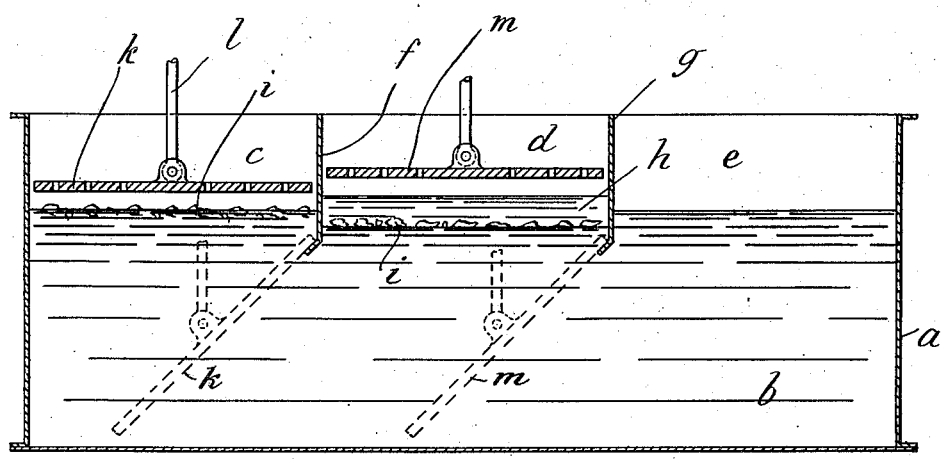
Inventor
John Stanley Morgan Patented Jan. 1, 1924.

1,479,731

UNITED STATES PATENT OFFICE.

JOHN STANLEY MORGAN, OF LONDON, ENGLAND, ASSIGNOR TO THERMAL INDUSTRIAL AND CHEMICAL (T. I. C.) RESEARCH COMPANY LIMITED, OF LONDON, ENGLAND, A BRITISH COMPANY.

PROCESS FOR DETINNING IRON.

Application filed June 21, 1921. Serial No. 479,363.

(GRANTED UNDER THE PROVISIONS OF THE ACT OF MARCH 3, 1921, 41 STAT. L., 1313.)

*To all whom it may concern:*

Be it known that I, JOHN STANLEY MORGAN, a subject of the King of Great Britain, residing in London, England, have invented certain new and useful Improved Processes for Detinning Iron (for which I have filed an application in Great Britain dated June 8, 1920, Serial No. 15,516), of which the following is a specification.

In the tinning operation, in order that the molten tin or alloy may adhere to the iron immersed therein, the iron sheet must be treated with a suitable flux before it is immersed. This preliminary treatment alters the surface tension relationship so that the the tin spreads evenly over the iron and adheres to it.

We have found that certain substances have an effect the reverse of that of the said flux in that instead of causing the tin to spread over and adhere to the iron they cause it to refuse to wet the iron. Such substances may conveniently be termed "anti-fluxes".

When tinned iron is suitably heated in contact with an anti-flux, the metal melts and collects in small globules distributed over the surface of the iron, but having little or no tendency to run off the iron. By this behaviour of the tinned iron in contact with a given substance the latter may be known to be an anti-flux; the tin plate may be heated above the melting point of tin, the substance sprinkled upon it and the behaviour of the tin noted. This test is recited because all substances have not been tested by us in respect of their behaviour as anti-fluxes; we have found that metal salts and hydroxides which are liquid at the melting point of tin are anti-fluxes, with few exceptions. The best at present known to us is caustic soda, which indeed has already entered into several processes for de-tinning iron, but purely as a chemical agent, not for the sake of the physical effect for which we use it.

The invention consists in treating the tinned iron with an anti-flux at a temperature above the melting point of tin, and removing the tin by a physical or mechanical operation. It is to be understood that during the treatment of the tinned iron with the anti-flux, the tin remains substantially unoxidized and is removed in the metallic condition.

The best process, according to the invention, consists in subjecting the tinned iron at a temperature above the melting point of tin to the action of an anti-flux while passing the metal through the surface of a liquid with which the anti-flux does not mix, and which is at a temperature above the melting point of tin. Under these conditions the tin is removed from the iron. A bath of molten tin supplies the best liquid surfaces, but a bath of molten lead or lead alloy at the proper temperature is cheaper. It is a matter of indifference whether the tinned iron is treated with anti-flux before it passes through the liquid surface, or passes through the surface into anti-flux. For instance, the anti-flux may first be applied to the heated metal, and the latter then passed through the surface of a bath of molten lead; or the metal may be caused to emerge through a surface of molten lead which is covered with the anti-flux. In either case the tin will leave the iron and enter the lead.

A convenient mode of applying the invention consists in submerging the material, such as tin plate scrap, used cans or the like, in a bath of molten lead, causing it to emerge at another part of the bath into a layer of caustic soda kept melted by the hot lead, and then submerging it again in the lead in order that it may emerge at a third part of the bath.

The accompanying drawing represents a vertical section through a tank containing molten lead and adapted for the practice of this invention.

The tank *a* is charged with molten lead *b*. The upper part of the tank is subdivided by partitions *f* and *g* extending below the surface of the lead into compartments *c*, *d* and *e*. The partitions *f* and *g* are bent along their lower edges in the same direction at an angle of about 120°. In the middle compartment *d* is a layer *h* of caustic soda kept molten by the heat of the molten lead.

The tin scrap *i* to be treated is thrown on to the surface of the lead in compartment *c*. The perforated plunger *k* pivoted to its rod *l* is now thrust into the compartment and through the molten lead. It carries with it the tinned scrap in a more or less vertical direction until its edge is caught by the inclined lower edge of the partition $f$. The continued downward movement of the plunger now brings it into the inclined position, shown in dotted lines, whereupon the tin scrap $i$ slides upwards in contact with the under surface of the plunger and emerges from the molten lead into the layer of caustic soda $h$. A plunger $m$ resembling plunger $k$ is now thrust through the caustic soda and molten lead to carry the tin scrap back into the bath. During the downward movement of the plunger its edge is caught by the inclined lower edge of the partition $g$ and the plunger assumes the position shown in dotted lines, whereupon the tin scrap slides upwards against the under surface of the plunger and emerges from the lead in the compartment $e$, where it is removed in de-tinned condition. The lead bath is gradually enriched in tin and may eventually be treated metallurgically for recovery of this metal.

Having thus described the nature of the said invention and the best means I know of carrying the same into practical effect, I claim:—

1. A process of de-tinning iron which consists in treating the material at a temperature above the melting point of tin with a substance which is liquid at the temperature of operation and causes the tin to lose its adhesion to iron, and removing the tin from the surface of the iron by a physical operation.

2. A process of de-tinning iron, which consists in treating the material at a temperature above the melting point of tin with molten caustic soda and then removing the tin from the surface of the iron by a physical operation.

3. A process of de-tinning iron which consists in treating the material at a temperature above the melting point of tin with a substance that is liquid at the temperature of operation and causes the tin to lose its adhesion to the iron while passing the material through the surface of a liquid with which the said substance does not mix and which is at a temperature not below the temperature of operation.

4. A process of de-tinning iron which consists in passing the material through the interface of a body of molten metal and a layer of a molten substance which causes the tin to lose its adhesion to the iron.

5. A process of de-tinning iron which consists in passing the material through the interface of a body of molten tin and a layer of a molten substance which causes the tin to lose its adhesion to the iron and tin.

6. A process of de-tinning iron which consists in passing the material through the interface of a layer of molten caustic soda and a body of molten metal.

7. A process of de-tinning iron which consists in passing the material through the interface of a layer of molten caustic soda and a body of molten tin.

8. A process of de-tinning iron which consists in submerging the material beneath one part of the surface of a bath of molten metal at a temperature above the melting point of tin, allowing it to emerge on another part of the surface into a layer of a molten substance which causes the tin to lose its adhesion to the iron, again submerging it beneath this part of the surface and finally allowing it to emerge at a third part of the surface.

In testimony whereof I have signed my name to this specification.

JOHN STANLEY MORGAN.